United States Patent [19]

Tanaka

[11] Patent Number: 4,466,029
[45] Date of Patent: Aug. 14, 1984

[54] METHOD AND APPARATUS FOR DETECTING AN EDIT POINT ON A RECORD MEDIUM

[75] Inventor: Masato Tanaka, Tokyo, Japan

[73] Assignee: Sony Corporation, Tokyo, Japan

[21] Appl. No.: 290,197

[22] Filed: Aug. 5, 1981

[30] Foreign Application Priority Data

Aug. 8, 1980 [JP] Japan .............................. 55-109664

[51] Int. Cl.³ ...................... G11B 15/18; G11B 27/02
[52] U.S. Cl. ...................................... 360/72.2; 360/13
[58] Field of Search .................... 360/72.2, 13, 14, 32, 360/74.4

[56] References Cited

U.S. PATENT DOCUMENTS 3,714,382  1/1973  Sykes ................................... 360/72.2
3,727,203  4/1973  Crossman ........................... 360/72.2

FOREIGN PATENT DOCUMENTS 2054944  7/1979  United Kingdom .
2034954  6/1980  United Kingdom .
2057745  8/1980  United Kingdom .

Primary Examiner—Vincent P. Canney
Attorney, Agent, or Firm—Lewis H. Eslinger; Alvin Sinderbrand

[57] ABSTRACT

An edit point, such as a splice edit point on a record medium of the type having data recorded in at least one data track and a periodic control signal recorded in a control track, is detected. The periodic control signal includes an address signal for identifying recurring intervals on the record medium, with data being recorded in the data tracks in successive ones of such recurring intervals. The address signal normally is incremented from one interval to the next. Upon reproduction, the address signal is reproduced, and successive predictive address signals are generated, from one interval to the next, as a function of at least an initial one of the reproduced address signal. When an address signal reproduced in an interval differs from the predictive address signal generated for that interval, the occurrence of the splice point is detected.

18 Claims, 16 Drawing Figures

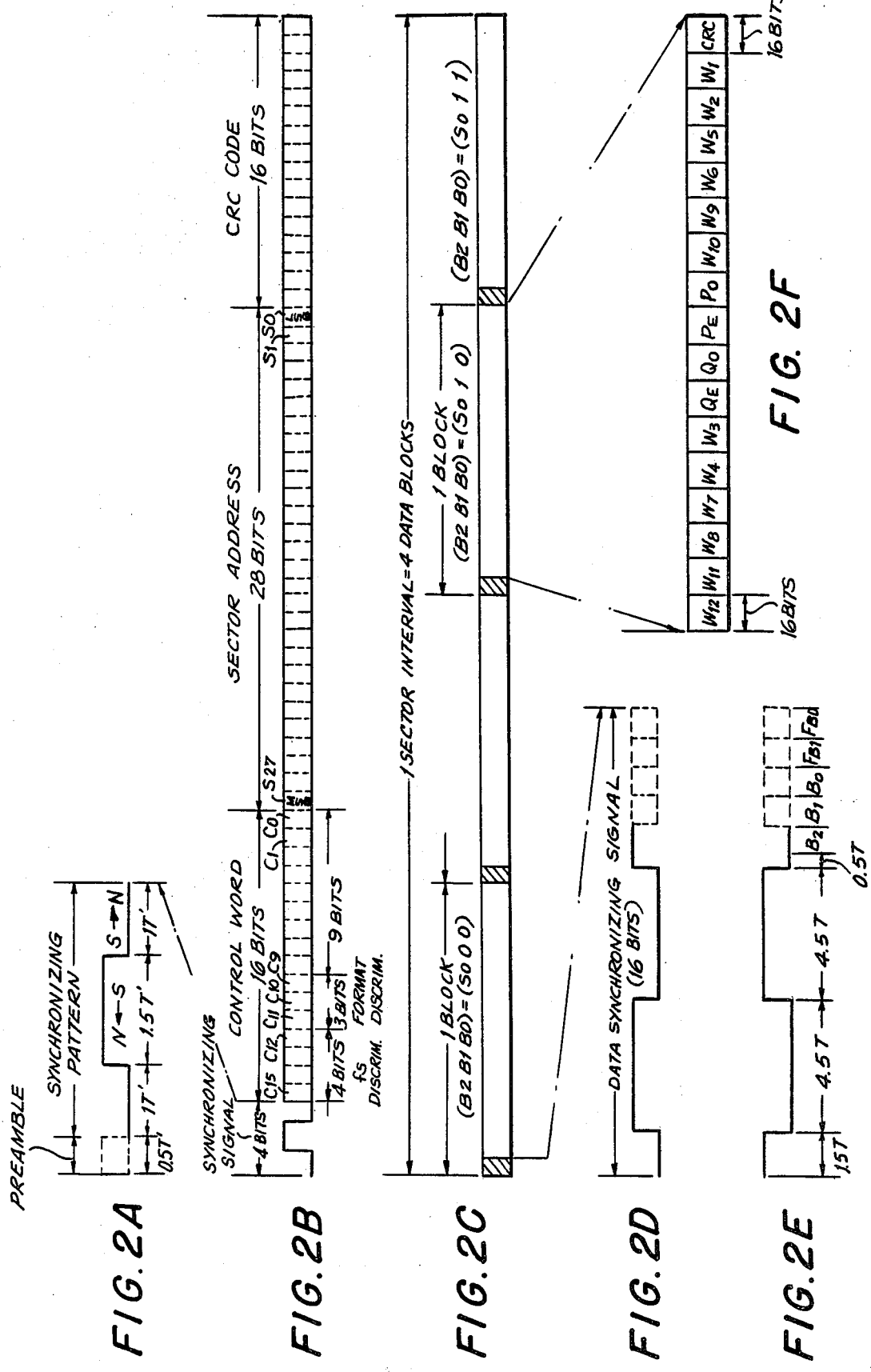

FIG. 3A

| DATA TRACK | DATA SEQUENCE | n | n+1 | n+2 | n+3 | n+4 | n+5 | n+6 | n+7 | n+8 | n+9 | n+10 | n+11 | n+12 | n+13 | n+14 | n+15 |
|---|---|---|---|---|---|---|---|---|---|---|---|---|---|---|---|---|---|
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

FIG. 3B

| | DATA SEQUENCE | n | n+2 | n+4 | n+6 | n+8 | n+10 | n+12 | n+14 | n+16 | n+18 | n+20 | n+22 | n+24 | n+26 | n+28 | n+30 |
|---|---|---|---|---|---|---|---|---|---|---|---|---|---|---|---|---|---|
| DATA TRACK A | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+3 | n+5 | n+7 | n+9 | n+11 | n+13 | n+15 | n+17 | n+19 | n+21 | n+23 | n+25 | n+27 | n+29 | n+31 |
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

FIG. 3C

| | DATA SEQUENCE | n | n+4 | n+8 | n+12 | n+16 | n+20 | n+24 | n+28 | n+32 | n+36 | n+40 | n+44 | n+48 | n+52 | n+56 | n+60 |
|---|---|---|---|---|---|---|---|---|---|---|---|---|---|---|---|---|---|
| DATA TRACK A | BLOCK ADDRESS | 0 | 1 | 2 | 3 | 4 | 5 | 6 | 7 | 0 | 1 | 2 | 3 | 4 | 5 | 6 | 7 |
| DATA TRACK B | DATA SEQUENCE | n+1 | n+5 | n+9 | n+13 | n+17 | n+21 | n+25 | n+29 | n+33 | n+37 | n+41 | n+45 | n+49 | n+53 | n+57 | n+61 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK C | DATA SEQUENCE | n+2 | n+6 | n+10 | n+14 | n+18 | n+22 | n+26 | n+30 | n+34 | n+38 | n+42 | n+46 | n+50 | n+54 | n+58 | n+62 |
| | BLOCK ADDRESS | 0 | 1 | 2 | 3 | 4 | 5 | 6 | 7 | 0 | 1 | 2 | 3 | 4 | 5 | 6 | 7 |
| DATA TRACK D | DATA SEQUENCE | n+3 | n+7 | n+11 | n+15 | n+19 | n+23 | n+27 | n+31 | n+35 | n+39 | n+43 | n+47 | n+51 | n+55 | n+59 | n+63 |
| | BLOCK ADDRESS | 0 | 1 | 2 | 3 | 4 | 5 | 6 | 7 | 0 | 1 | 2 | 3 | 4 | 5 | 6 | 7 |
| CONTROL TRACK (SECTOR ADDRESS) | | 4m+0 | | | | 4m+1 | | | | 4m+2 | | | | 4m+3 | | | |

METHOD AND APPARATUS FOR DETECTING AN EDIT POINT ON A RECORD MEDIUM

BACKGROUND OF THE INVENTION

This invention relates to a method and apparatus for detecting an edit point on a record medium and, more particularly, to such a method and apparatus wherein digitized information is recorded in data tracks on the record medium and a control signal including an address signal for identifying recurring intervals on the record medium is recorded in a control track.

Recently, digital information has been recorded directly on a record medium, such as magnetic tape. Such digital recording techniques have been extended into fields which, heretofore, had been reserved solely for analog recording. For example, audio signals now are digitized as, for example, PCM signals, and the digitized audio signals are recorded. Typical PCM audio recorders are described in, for example, U.S. Pat. Nos. 4,211,997 and 4,145,683.

The use of digital techniques for recording audio information generally has enhanced the quality of the reproduced audio sounds. Furthermore, desired portions of the digitized information may be easily and precisely accessed. This facilitates the electronic editing of a digitized audio record.

However, whereas loss of information in an analog record generally may be concealed, or masked, so as to be generally unnoticed, a comparable loss of digitized information due to, for example, drop-out, interference, fingerprints on the record medium, and the like, may be highly pronounced. Accordingly, to minimize such disturbances, the digitized information generally is recorded in an error-correction code. One recent error correcting code which has been developed and which is particularly useful in recovering digitized information that may be subjected to such drop-out, interference, and the like is the so-called cross-interleave error correction code described in, for example, U.S. application Ser. No. 218,256, filed Dec. 19, 1980. Other error correction encoding techniques also are known, such as described in U.S. Ser. No. 195,625, filed Oct. 9, 1980. In accordance with such error correction codes, a number of digital words, such as PCM words, are time-interleaved with each other to form data blocks. Successive data blocks are recorded in one or more data tracks on, for example, magnetic tape. If a separate control track also is recorded, address signals may be recorded in that control track so as to identify predetermined intervals, such as "sector intervals". By addressing the appropriate sector interval, the data blocks recorded therein may be readily accessed. This feature is advantageous when it is desired to edit the information in certain sector intervals. When using this technique, it is best to increment the address signals, known as sector address signals, consecutively from one interval to the next.

While a magnetic tape which is recorded in the aforementioned manner, viz. having a plurality of data tracks and a single control track recorded thereon, may admit of relatively smooth electronic editing such that the various edit points are not readily noticed, such digitally recorded tapes are less advantageously used in so-called "splice editing". In splice editing, two separate magnetic tapes are physically joined, or spliced, such that the information recorded on one tape physically follows the information that is recorded on the other. It is expected that, on either side of the "splice" or joint, the digitally recorded information may be subjected to error. In particular, a discontinuity is present in the reproduced digitized information when the splice point is reached. To prevent this discontinuity from seriously interfering with the audio signals which ultimately are reproduced from the digital recording, techniques such as the so-called cross-fading technique, muting, and the like, generally are employed. These techniques are described in, for example, aforementioned U.S. Ser. No. 195,625 and also in U.S. Ser. No. 116,401, filed Jan. 29, 1980.

When minimizing the effects caused by the discontinuity at the splice edit point, it is important to detect when this point has been reached. One technique for detecting the occurrence of the splice edit point is described in U.S. Ser. No. 169,093, filed July 15, 1980. In this technique, a control signal is recorded, and the phase of this control signal is sensed during a playback operation. If the relative phase of the control signal is delayed or advanced with respect to its expected phase, the edit splice point is indicated. Unfortunately, there is a limit on the precision of this control signal phase detection technique such that the precise location of the splice point might not be detected with as high a degree of accuracy as can be attained by the present invention.

Another technique that has been proposed for detecting the location of a splice point is to sense the high occurrence of errors in the reproduced data signals. Since there is a high probability of error, and thus a high frequency of occurrence of errors at the splice point, it had been thought that this phenomenon can be turned to account in detecting the location of the splice point. However, it often is difficult to discriminate between errors which occur at a splice point or errors which occur at a high rate because of drop-out, fingerprints, dust, and the like. Consequently, the use of an error-rate detection technique often may provide false indications of the location of a splice point.

OBJECTS OF THE INVENTION

Therefore, it is an object of the present invention to avoid the aforenoted disadvantages and defects in detecting the location of an edit point, and particularly a splice edit point, on a record medium of the type having digital information recorded in data tracks.

Another object of this invention is to provide an improved method and apparatus for detecting a splice point on a record medium of the type having a control track thereon in which a control signal including a progressively incremented address signal is recorded.

A further object of this invention is to provide a method and apparatus for detecting a splice point, as aforesaid, wherein a discontinuity in the address signal is used as an indication of the location of the splice point.

An additional object of this invention is to provide an improved method and apparatus for accurately and reliably detecting an edit point on a record medium, such as a magnetic tape, having digitized information, such as PCM audio signals, recorded in plural data tracks thereon.

Various other objects, advantages and features of the present invention will become readily apparent from the ensuing detailed description, and the novel features will be particularly pointed out in the appended claims.

SUMMARY OF THE INVENTION

In accordance with this invention, a splice point on a record medium having data recorded thereon in at least one data track and having a periodic control signal recorded in a control track, the periodic control signal including an address signal for identifying recurring intervals on the record medium, is detected. The address signal normally is incremented from one interval to the next such that the address represented thereby progressively changes. The address signal is reproduced from the record medium, and successive predictive address signals are generated from one interval to the next as a function of an initially reproduced address signal. For example, in accordance with one aspect of this invention, an initial reproduced address signal is loaded into a counter and then, as each interval is reproduced, the counter is incremented, thereby producing the successive predictive address signals. When a reproduced address signal differs from the predictive address signal, the occurrence of a splice point is detected.

In accordance with one aspect of this invention, the occurrence of the splice point is determined by sensing when two successive reproduced address signals differ from two successive predictive address signals. It is a feature of this invention to load the aforementioned counter with the address signal which then is reproduced at the time that the splice point is indicated.

In accordance with another feature of this invention, the splice point is indicated when a discontinuity in the reproduced address signals is sensed and, following this discontinuity, the reproduced address signals once again change uniformly, from one interval to the next, in a logical manner.

BRIEF DESCRIPTION OF THE DRAWINGS

The following detailed description, given by way of example, will best be understood in conjunction with the accompanying drawings in which:

FIGS. 2A–2F are timing diagrams representing the various signals that are recorded in the data and control tracks of the record medium with which the present invention is used;

FIGS. 3A–3C are tables which are helpful in understanding the relationship among the different formats with which the present invention is used;

DETAILED DESCRIPTION OF CERTAIN PREFERRED EMBODIMENTS

Figure 1A:
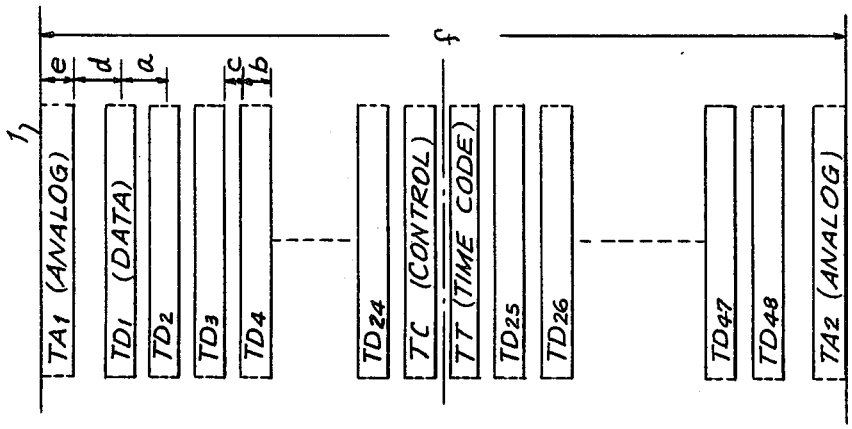
FIGS. 1A–1C are schematic diagrams representing different examples of track patterns with which the present invention is used.
Figure 1B:
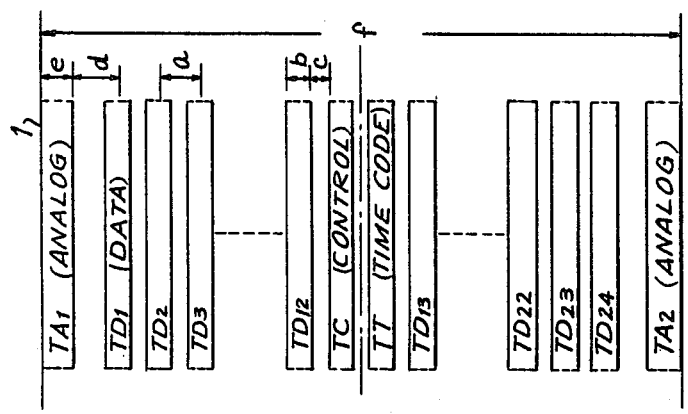
Figure 1C:
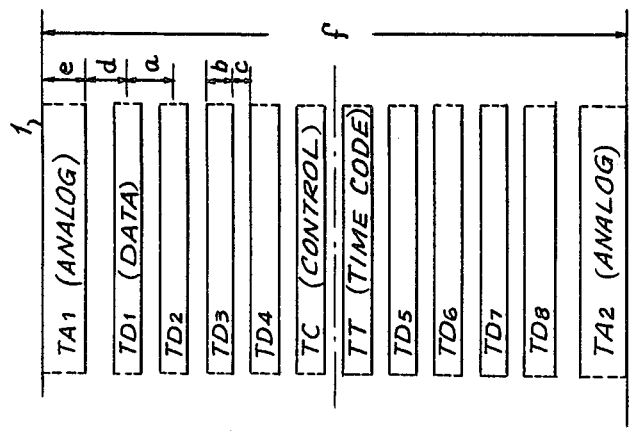

Referring now to the drawings, and in particular to FIGS. 1A–1C, there are illustrated herein three examples of different magnetic tape configurations with which the present invention can be used. It is assumed that this magnetic tape moves with respect to fixed recording and reproducing transducers. Preferably, and as will be described, the recording transducers, or heads, are arranged in an assembly so as to record plural tracks concurrently. These tracks are illustrated in FIG. 1A as being recorded on magnetic tape 1 of, for example, ¼ inch width. FIG. 1B illustrates the tracks which are recorded on magnetic tape of one-half inch width; and FIG. 1C illustrates the tracks which are recorded on magnetic tape of one inch width. As illustrated, the respective tracks are parallel with each other and extend in the longitudinal direction along the magnetic tape.

In FIG. 1A, the ¼ inch tape 1 is illustrated as having marginal tracks $TA_1$ and $TA_2$ adjacent the opposite edges thereof. These marginal tracks are adapted to have analog signals recorded therein. For example, when tape 1 is used to record digital audio signals, analog tracks $TA_1$ and $TA_2$ are used to record analog audio signals. These analog audio signals are useful in locating desired portions of the magentic tape for use in editing operations, such as so-called splice editing or electronic editing.

Magnetic tape 1 is illustrated as having a center line on either side of which are provided tracks TC and TT. Track TC is a control track adapted to have a control signal recorded therein. This control signal is illustrated in greater detail in FIG. 2B. Track TT is adapted to have a time code recorded therein.

Data tracks $TD_1$, $TD_2$, $TD_3$ and $TD_4$ are disposed, or sandwiched, between analog track $TA_1$ and control track TC. Similarly, data tracks $TD_5$, $TD_6$, $TD_7$ and $TD_8$ are disposed, or sandwiched, between time code track TT and analog track $TA_2$. It will be appreciated that the digitized information, such as digital audio signals, is recorded in each of the data tracks TD. In the illustrated example of ¼ inch tape, the digitized information may be recorded in any one of different formats. As an example, and for the purpose of illustration, three separate formats are described herein, these formats being referred to as format A, format B and format C, respectively. As one example thereof, digitized information is recorded in format A in one track per channel. That is, if eight channels of digitized information are provided, these eight channels are recorded in data tracks $TD_1$–$TD_8$, respectively. In format B, the digitized information is recorded in two tracks per channel. That is, since eight data tracks are provided, a total of four channels may be recorded, wherein channel 1 is recorded in tracks $TD_1$ and $TD_5$, channel 2 is recorded in tracks $TD_2$ and $TD_6$, and so on. In format C, the digitized information is recorded in four tracks per channel. Thus, with the eight data tracks illustrated in FIG. 1, a total of two channels may be recorded. Digital signals from channel 1 are recorded in tracks $TD_1$, $TD_3$, $TD_5$ and $TD_7$; and digital signals from channel 2 are recorded in tracks $TD_2$, $TD_4$, $TD_6$ and $TD_8$. The particular manner in which the digital signals are recorded in the respective tracks is described in greater detail hereinbelow.

In FIG. 1A, the following representations are used for the indicated dimensions:
 a = data track pitch;
 b = data track width;
 c = guard band width separating adjacent data tracks;

d = clearance between adjacent analog and data tracks from the edge of the analog track to the center of the adjacent data track;
e = analog track width; and
f = tape width.

A numerical example of the foregoing dimensions follows:

a = 480 μm (microns)
b = 280 to 380 μm
c = 200 to 100 μm
d = 540 μm
e = 445 μm
f = 6.30 mm $+0_{-20}$ μm FIG. 1B illustrates magnetic tape having one-half inch width. As in the FIG. 1A arrangement, tape 1 is provided with a pair of marginally-extending analog tracks $TA_1$ and $TA_2$; and on either side of the center line of the tape is a control track TC and a time code track TT, respectively. Data tracks $TD_1$–$TD_{12}$ are disposed, or sandwiched, between analog track $TA_1$ and control track TC. Similarly, data tracks $TD_{13}$–$TD_{24}$ are disposed, or sandwiched, between time code track TT and analog track $TA_2$. It is seen that, since one-half inch tape 1 (FIG. 1B) is twice the width of the ¼ inch tape shown in FIG. 1A, twice the number of data tracks are provided. Of course, each channel of digitized information may be recorded in a predetermined number of data tracks depending upon the format selected for recording.

Consistent with the foregoing representations of respective dimensions, a numerical example for the illustrated dimensions in FIG. 1B may be as follows:

a = 440 μm
b = 240 to 340 μm
c = 200 to 100 μm
d = 500 μm
e = 325 μm
f = 12.65 mm ± 10 μm

FIG. 1C illustrates magnetic tape 1 having one inch width. As before, this one inch width tape is provided with a pair of oppositely disposed marginal tracks $TA_1$ and $TA_2$ for recording analog signals therein, and disposed on opposite sides of a center line are control track TC and time code track TT, respectively. Data tracks $TD_1$–$TD_{24}$ are disposed, or sandwiched, between analog track $TA_1$ and control track TC. Data tracks $TD_{25}$–$TD_{48}$ are disposed, or sandwiched, between time code track TT and analog track $TA_2$. It is seen that forty-eight data tracks are provided for the recording of digitized information in the one inch width tape. Here too, each channel is recorded in a predetermined number of data tracks in accordance with the particular format which has been selected for recording that information.

Consistent with the foregoing dimensional representations, one example thereof which can be used to form the 48-track one inch width tape shown in FIG. 1C is as follows:

a = 480 μm
b = 280 to 380 μm
c = 200 to 100 μm
d = 540 μm
e = 325 μm
f = 25.35 mm ± 10 μm

From the foregoing examples, it is appreciated that, in accordance with one embodiment, the ¼ inch width tape is adapted to record eight data tracks, the one-half inch width magnetic tape is adapted to record 24 data tracks and the one inch width magnetic tape is adapted to record 48 data tracks.

It may be appreciated that, when format A is selected such that one track per channel is used for recording, the magnetic tape is advanced at a speed referred to herein as its highest speed. When format B is used such that two tracks per channel are employed for recording, the tape speed may be reduced by half, and this lesser speed is referred to as the medium speed. When format C is used such that four tracks per channel are utilized for recording, the tape speed may be reduced by one-half again, and this is referred to as the slowest tape speed. A numerical example for tape having ¼ inch width is as follows:

|  | Format A | Format B | Format C |
| --- | --- | --- | --- |
| Number of channels | 8 | 4 | 2 |
| Number of tracks per channel | 1 | 2 | 4 |
| Tape speed (cm/sec) | 76.00 | 38.00 | 19.00 |

It is appreciated that, when more tracks per channel are used, the tape speed may be reduced, thereby reducing tape consumption and enabling so-called long-playing tapes. However, as tape consumption is reduced, thereby increasing the playing time, the number of channels which may be recorded likewise is reduced.

In the foregoing table, the digitized information recorded in the respective data tracks is derived from analog signals, these analog signals being sampled at a predetermined sampling rate and each sample being converted to digital form. As a numerical example, the sampling rate $f_s$ which is used to produce the digitized information is on the order of 50.4 kHz. Other sampling frequencies $f_s$ may be used. It is appreciated that, as other sampling frequencies are employed, the speed at which the tape is driven for recording the digitized information in their respective formats likewise may be reduced. Thus, for a sampling frequency $f_s$ on the order of about 44.1 kHz, the tape speed for ¼ inch tape recording in format A may be on the order of about 66.5 cm/sec. For the sampling frequency $f_s$ on the order of about 32.0 kHz, the tape speed for the ¼ inch tape recording in format A is on the order of about 48.25 cm/sec. Of course, the foregoing tape speeds are halved when format B is adopted, and these tape speeds are halved again when format C is adopted.

It will be explained below that the particular encoding scheme, that is, the code configuration, as well as the type of modulation used for modulating the encoded signal for recording are the same for each of the respective formats in the presently described embodiment.

Turning now to FIGS. 2A–2F, there are illustrated a typical example of the control signal that is recorded in control track TC and a typical example of the digitized information that is recorded in a typical data track TD. FIG. 2B is a timing diagram representing the control signal; and FIGS. 2C–2F, in combination, are timing diagrams representative of the digitized information.

The control signal having the timing representation shown in FIG. 2B is recorded in control track TC for all formats. This control signal is comprised of a synchronizing signal positioned at the head, or beginning portion thereof, followed by a 16-bit control word formed of control data bits $C_0$–$C_{15}$, followed by a 28-bit sector address formed of address bits $S_0$–$S_{27}$, followed by a 16-bit error detecting code word, such as the cyclic redundancy code (CRC) word. Although the control signal shown in FIG. 2B is comprised of predetermined segments each formed of a preselected number of bits, it will be appreciated that, if desired, other segments may be used; and each of the illustrated segments may be formed of any desired number of bits capable of representing control data, sector addresses and error detecting codes.

The term "sector" or "sector interval", as used herein, refers to a predetermined time interval which corresponds to a predetermined recording length, or interval, on the record medium. The sector interval is defined by the control signal illustrated in FIG. 2B. Successive control signals are recorded in successive, abutting sector intervals. As each control signal is recorded in a sector interval, the sector address is incremented by unity (i.e. by one bit). Hence, the sector address serves to identify the particular sector interval in which the control signal is recorded. The desired sector interval may be accessed merely by addressing the corresponding sector address. It is appreciated that $2^{28}$ successive sector intervals may be recorded on, for example, a length of magnetic tape; and the corresponding sector addresses will be incremented from one sector interval to the next so as to appear as, for example, [000 ... 000], [000 ... 001], [000 ... 010], [000 ... 011], and so on. As will be explained below, digitized information is recorded in the respective data tracks TD during each of the successive sector intervals.

The synchronizing signal which precedes the control word is illustrated with an expanded time scale in FIG. 2A. The synchronizing signal occupies a duration equal to four control signal bit cells, wherein a bit cell is equal to the interval occupied by a respective bit of the control word, the sector address and the CRC code. The synchronizing signal is seen to exhibit a predetermined, constant synchronizing pattern preceded by a "preamble". The purpose of the preamble is to accommodate the last, or least significant bit of the CRC code, included in the immediately preceding control signal, so as to ensure that the synchronizing pattern will appear as illustrated. For example, if the last bit of the preceding control signal is a binary "1", which exhibits a relatively higher level, the preamble of the immediately-following synchronizing signal also is a relatively higher binary "1" level for a duration equal to 0.5T' (where T' is equal to the bit cell duration of a control signal bit). Conversely, if the last bit of the immediately preceding control signal is a binary "0", which is represented by a signal of relatively lower level, the preamble of the next-following synchronizing signal also is equal to a relatively lower binary "0" level for this duration 0.05T'. Hence, the preamble is seen to exhibit either a first or a second logical sense depending upon the state of the last bit of the immediately preceding control signal.

The synchronizing pattern which is included in the synchronizing singal and which follows the preamble exhibits a positive-going transition at a period 1T' following the preamble, and then exhibits an opposite, negative-going transition at a period 1.5T' following the first-mentioned positive-going transition. The synchronizing signal ends, and the control word commences, at a period 1T' following this second, negative-going transition. This particular synchronizing pattern is advantageous in that it is distinct from any bit pattern included in the control word, sector address or CRC code of the control signal. Hence, this synchronizing pattern may be readily detected during a reproducing operation so as to identify the beginning of successive sector intervals. Also, this synchronizing pattern, when detected, may be used to synchronize the detection of the control word, sector address and CRC code of the control signal, and also may be used in a servo control circuit for controlling the tape drive during a reproducing operation. When the present invention is used with a magnetic recording medium, the transitions in the recorded signal, such as the illustrated transitions which comprise the synchronizing pattern, represent magnetic vectors.

The control word is adapted to represent control data for the purpose of identifying the particular format that is used to record the digitized information. For example, control bits $C_{12}$–$C_{15}$ may represent the sampling rate that has been used to digitize the analog signal, resulting in the digitized information that is recorded. Alternatively, since the speed at which the record medium is driven is related to the sampling rate, control bits $C_{12}$–$C_{15}$ may represent this tape speed. As an example, for the three representative sampling rates mentioned above, control bits $C_{12}$–$C_{15}$, which are referred to herein as the sampling rate identification signal may be as follows:

| Sampling Rate Identification Signal | | | | Sampling Rate (kHz) |
|---|---|---|---|---|
| $C_{15}$ | $C_{14}$ | $C_{13}$ | $C_{12}$ | $f_s$ |
| 0 | 0 | 0 | 0 | 50.4 |
| 0 | 0 | 0 | 1 | 44.1 |
| 0 | 0 | 1 | 0 | 32.0 |

It is seen that, if desired, up to sixteen different sampling rates may be accommodated by the sampling rate identification signal ($C_{12}$–$C_{15}$).

Control bits $C_9$–$C_{11}$ represent the number of tracks per channel in which each channel of digitized information is recorded. From the description set out hereinabove, it is recalled that in format A, each channel of digitized information is recorded in a respective data track. In format B, each channel of digitized information is recorded in two separate data tracks. In format C, each channel of digitized information is recorded in four separate data tracks. The number of tracks per channel may be represented by control bits $C_9$–$C_{11}$ as follows:

| $C_{11}$ | $C_{10}$ | $C_9$ | Tracks/Channel | Format |
|---|---|---|---|---|
| 0 | 0 | 0 | 1 | A |
| 0 | 0 | 1 | 2 | B |
| 0 | 1 | 0 | 4 | C |

It is appreciated that a total of eight different format characteristics, including the number of tracks per channel, may be represented by the 3-bit code $C_9$–$C_{11}$. For purposes of illustration, and in the interest of simplification and brevity, only three such characteristics (i.e. tracks per channel) are illustrated.

Control bits $C_0$–$C_8$ are used to represent other elements which constitute respective formats. For example, different encoding schemes may be used to encode the digitized information. Such encoding schemes include the aforementioned cross-interleave code. Modifications of the cross-interleave code also may be used, as desired. Furthermore, an encoding scheme which is adapted to minimize distortion due to the DC component of the digital signals recorded on the record medium also may be used, such as described in U.S. Ser. No. 201,781, filed Oct. 29, 1980, the disclosure thereof being incorporated herein by reference. Other examples of interleaved error correction encoding techniques are described in, for example U.S. Ser. Nos. 218,256, filed Dec. 19, 1980, 195,625, filed Oct. 9, 1980, 230,395, filed Feb. 2, 1981 and 237,487, filed Feb. 23, 1981, the disclosures of which are incorporated herein by reference.

In addition to being encoded in a desired encoding scheme, which encoding scheme is represented by selected ones of data bits $C_0$–$C_9$, the encoded digitized information may also be modulated prior to recording. One example of a type of modulation that may be used is described in Application Ser. No. 222,278, filed Jan. 2, 1981, the disclosure of which is incorporated herein by reference. In this modulator, the encoded digital signals are modulated so as to establish strict limitations on the minimum and maximum intervals between successive transitions, thereby avoiding distortion when the digitized signals are reproduced. Of course, other types of modulation may be used, such as the so-called 3PM type, or MFM type, or bi-phase modulation, as desired. The particular type of modulation which is used is represented by selected ones of control bits $C_0$–$C_9$.

Thus, it is appreciated that the control data comprised of bits $C_0$–$C_{15}$ represent the particular format which is used to sample, encode, modulate and record the input information.

The sector address comprised of bits $S_0$–$S_{27}$ may be generated by, for example, a counter that is incremented in synchronism with the processing and recording of each sector interval. Preferably, the control data and the sector address data are used to produce an appropriate CRC code, or other error detecting code, from which the presence of an error in the control word and/or sector address may be detected upon reproduction. The formation of a CRC code and the manner in which it is used are known to those of ordinary skill in the art and, in the interest of brevity, further description thereof is not provided.

As will be described below, the control signal illustrated in FIG. 2B is frequency modulated, and the FM-modulated control signal then is recorded in control track TC. Thus, regardless of the particular format which is used to record the digitized information, the FM-modulated control signal described hereinabove is common to such different formats.

FIG. 2C is a representative timing diagram illustrating the manner in which digitized information is recorded in a respective data track TD. For simplification, reference is made initially to the recording of digitized information in one track per channel. In accordance with the aforementioned cross-interleave error correction encoding techniques, successive samples of an input analog signal, such as an audio signal, are converted to corresponding digital information words, and these digital information words are used to produce error-correction words, such as parity words P. Then, a predetermined number of information words and parity words are time-interleaved to form sub-blocks, and a further error-correction word, such as a Q-parity word, is derived from the time-interleaved sub-block. Odd and even information words and their respective P-parity and Q-parity words are cross-interleaved to form a data block comprising, for example, twelve information words, four parity words and an error-detection word, such as a CRC code word, derived therefrom. A respective data block is preceded by a data synchronizing signal and, as illustrated in FIG. 2C, four successive data blocks are recorded in a sector interval. Of course, the data blocks may be modulated prior to recording, as described above.

When format A is used, wherein the digitized information is recorded in one track per channel, successive data blocks are recorded in seriatum in a corresponding data track TD. When the digitized information is recorded in format B, wherein two tracks per channel are used, each of these two data tracks is provided with successive data blocks as shown in FIG. 2C. However, such recorded data blocks need not necessarily be sequential blocks. For example, the first data block may be recorded in block position #1 of a first of the two tracks, and the second data block may be recorded in block position #1 in the second data track. Then, the third data block may be recorded in block position #2 in the first track and the fourth data block may be recorded in block position #2 in the second data track. This distribution of data blocks may continue such that, for example, in the first data track, data blocks 1, 3, 5, 7 and so on are recorded; and in the second data track, data blocks 2, 4, 6, 8 and so on are recorded.

If format C is selected, wherein four tracks per channel are used for recording, the first data block is recorded in block position #1 of a first data track, the second data block is recorded in block position #1 of a second data track, the third data block is recorded in block position #1 of a third data track, and the fourth data block is recorded in block position #1 of the fourth data track. Then, the fifth data block is recorded in block position #2 of the first data track, the sixth data block is recorded in block position #2 of the second data track, the seventh data block is recorded in block position #2 of the third data track and the eighth data block is recorded in block position #2 of the fourth data track. Hence, the first data track has recorded therein the data blocks of sequence 1, 5, 9, 13 and so on; the second data track has recorded therein the sequence of data blocks 2, 6, 10, 14 and so on; the third data track has recorded therein the sequence of data blocks 3, 7, 11, 15 and so on; and the fourth data track has recorded therein the sequence of data blocks 4, 8, 12, 16 and so on.

Nevertheless, regardless of the particular format, or number of tracks per channel which is used, each data track has succeeding data blocks recorded therein in the manner shown in FIG. 2C. Thus, during each sector interval, four succeeding data blocks are recorded, each data block being preceded by a data synchronizing signal. Advantageously, the control signal recording head is in proper alignment with the information signal recording heads such that all of the data tracks are in alignment across the width of the magnetic medium, that is, all of the data synchronizing signals are in alignment, and the information signals also are in alignment with the control signal recorded in control track TC. Hence, the synchronizing signal which is recorded at the head of the control signal is in alignment with the data synchronizing signals as each of the first data blocks recorded in a particular sector interval. Alternatively, the control signal recording head may be displaced from the information signal recording heads by a distance equal to an integral multiple of a sector interval.

The data synchronizing signal which precedes each data block (shown by the cross-hatched areas in FIG. 2C) is illustrated with an expanded time scale in FIGS. 2D and 2E. The data synchronizing signal occupies an interval corresponding to sixteen data bit cells, wherein each data bit cell is equal to the duration of the recorded data bit. It should be appreciated that the duration of a data bit cell T is much smaller than the duration of a control bit cell T', for example, T'=18T. The data synchronizing signal includes a synchronizing pattern comprised of a first transition which occurs at an interval 1.5T following the beginning of the data synchronizing signal, a second transition which occurs at an interval 4.5T following the first transition, and a third transition which occurs at an interval 4.5T following the second transition. Since the data synchronizing signal of one data block follows immediately after the last bit of the preceding data block, the synchronizing pattern may exhibit the waveform shown either in FIG. 2D or 2E, depending upon the logic signal level of the final bit of the preceding data block.

The data synchronizing pattern is selected to be unique in that this pattern will not be exhibited by the information data included in the respective data blocks, even after modulation. For example, if the modulation described in U.S. Ser. No. 222,278 is adopted, transitions between data bits of the modulated digitized information are prohibited from exhibiting the pattern shown in FIGS. 2D and 2E. Consequently, the data synchronizing signal may be readily detected upon reproduction and used, for example, to restore timing, to detect the beginning of a data block, to synchronize the demodulation and decoding of the digitized information, and the like.

The data synchronizing pattern is followed, after a delay interval of 0.5T, by a block address comprised of bis $B_0$-$B_2$ which, in turn, is followed by flag bits $FB_1$ and $FB_0$. The block address [$B_2B_1B_0$] identifies the particular block position in which the data block is recorded. Preferably, the most significant bit $B_2$ of the block address is made equal to the least significant bit $S_0$ of the sector address of the particular sector in which the data block is recorded. Since the block address is comprised of three bits, it is appreciated that eight separate block positions may be represented thereby. Since four data blocks are recorded in a sector interval, and since the most significant block address bit $B_2$ is made equal to the least significant sector address bit $S_0$, it is appreciated that the block address [$B_2B_1B_0$] is repeated every two sector intervals. That is, eight separate block positions are recorded during every two sector intervals. If the most significant block address bit $B_2$ is equal to a binary "1", as determined by the least significant sector address bit $S_0$, then the data synchronizing signal shown in FIG. 2D is recorded. Alternatively, if the most significant block address bit $B_2$ is equal to a binary "0", then the data synchronizing signal illustrated in FIG. 2E is recorded.

Flag bits $FB_1$ and $FB_0$ are used, in the preferred embodiment of the present invention, as an emphasis identification signal. Preferably, when the present invention is used to record digital audio signals, the original analog audio signals are selectively subjected to emphasis prior to being digitized. If such analog signals are emphasized, that is, if a conventional emphasis circuit is actuated or "turned on", then the emphasis identification signal represents that the analog signal had been emphasized. For example, [$FB_1FB_0$]=[01]. Alternatively, if the input analog signals had not been emphasized, then the emphasis identification signal may be represented as [$FB_1FB_0$]=[00].

Typically, emphasis will occur over a sufficient duration such that all of the digitized signals from a particular channel which are recorded in two sector intervals will be emphasized. It is, therefore, not necessary to record the emphasis identification signal in each data block. Preferably, therefore, the emphasis identification signal is recorded only when the block address [$B_2B_1B_0$] is equal to [000]. Furthermore, if the digitized information is recorded in two tracks per channel, the emphasis identification signal may be recorded only in one of such two tracks, and as before, this emphasis identification signal is recorded only when the block address in that particular track is equal to [000]. Likewise, when the digitized information is recorded in four tracks per channel, the emphasis identification signal may be recorded in only a predetermined one of those tracks and, again, only when the block address in that track is equal to [000]. Consequently, flag bits $FB_1$ and $FB_0$ may be used to represent other information, or format data; as desired, when the block address is other than [000].

Although the emphasis identification signal has been described herein as being recorded in the first data block of, for example, even-numbered sector intervals ($S_0$="0"), the emphasis identification signal may, if desired, be recorded in the first data block in odd-numbered sector intervals ($S_0$="1").

As illustrated in FIGS. 2D and 2E, the data synchronizing signal interval is equal to a 16-bit interval which, in turn, corresponds to an information (or parity) word duration.

The information portion of each data block is illustrated with an expanded time scale in FIG. 2F. Each of information words $W_1$-$W_{12}$ is formed as a 16-bit word, and each is derived from a respective sample of the input analog signal. In addition to the information words $W_1$-$W_{12}$, each data block also includes odd and even parity words $P_O$ and $P_E$, respectively, and odd and even Q-parity words $Q_O$ and $Q_E$, respectively. The odd and even information and parity words are cross-interleaved in accordance with the techniques described in the above-referenced, incorporated patent applications. In addition, an error detecting word, such as a 16-bit CRC code word, is produced in response to the information and parity words, and also in response to the block address bits $B_0$-$B_2$ and the flag bits $FB_0$ and $FB_1$.

It will be appreciated that information words $W_1$-$W_{12}$ all are derived from the same channel. Odd-numbered and even-numbered information words are separated, and the respective parity words $P_O$, $P_E$ and $Q_O$ and $Q_E$ are derived from such separated information words. For example, odd parity word $P_O$ is produced in response to the six odd-numbered information words $W_1$, $W_3$ . . . $W_{11}$; and even parity word $P_E$ is produced in response to the six even-numbered information words $W_2$, $W_6$ . . . $W_{12}$. The odd-numbered information and parity words are time-interleaved, and the odd parity word $Q_O$ is produced therefrom. Likewise, the even-numbered information and parity words are time-interleaved, and the even parity word $Q_E$ is produced therefrom. Then, all of these time-interleaved odd and even words are cross-interleaved to form the illustrated data block. Preferably, the parity words are positioned in the central section of the data block, and successive odd-numbered (and even-numbered) information words are spaced from each other by a maximum distance. Thus, successive odd-numbered information words $W_1$ and $W_3$ are seen to be separated by the maximum distance which can be accommodated by the data block. Likewise, successive even-numbered information words $W_2$ and $W_4$ are separated by this maximum distance. This cross-interleaved error correction encoding technique facilitates the correction of what otherwise would be considered to be "uncorrectable" errors wherein successive information words are obliterated. Since there is a low probability that, for example, information words $W_1$ and $W_3$ both will be obliterated, when only one of these words is erroneous, it may be derived by interpolation techniques from the non-erroneous information words.

From the aforementioned patent applications, it will be appreciated that information words $W_1$ and $W_2$, for example, do not correspond to adjacent samples of the input analog signal. Such adjacent samples may be represented by information words that are recorded in widely separated data blocks. This is an advantageous feature of the aforementioned cross-interleave error correction encoding technique.

FIGS. 3A–3C illustrate the relationship among the recording formats A, B and C, respectively, wherein each channel of digitized information is recorded in one data track (format A), in two data tracks (format B) or in four data tracks (format C). Thus, in format A, as shown in FIG. 3A, successive data blocks are recorded in a single data track. In format B, as shown in FIG. 3B, successive data blocks are distributed alternately between tracks A and B. In format C, successive data blocks of a single channel are distributed, sequentially, in data tracks A, B, C and D. This distribution of data blocks in respective data blocks will be described in greater detail hereinbelow.

In FIGS. 3A–3C, the expression "data sequence" refers to the successive data blocks included in a particular channel, and the expression "block address" refers to the block # in which that particular data block is recorded in a respective data track. Furthermore, the expressions "n" and "m", as used in FIGS. 3A–3C, are integers. Accordingly, it is seen that, when format A is adopted, the first data block (n) is recorded in block #0 of, for example, the first sector interval (4m+0). The second data block (n+1) is recorded in block #1 of this sector interval, and so on. In the second sector interval (4m+1), the fifth data block (n+4) is recorded in block #4, the sixth data block (n+5) is recorded in block #5, and so on. At the next-following sector interval (4m+2), the block addresses are seen to repeat.

When format B is adopted, the first data block (n) is recorded in block #0 of track A in the first sector interval (4m+0), and the second data block (n+1) is recorded in block #0 of track B in this sector interval. The third data block (n+2) is recorded in block #1 Of track A in this sector interval, and the fourth data block (n+3) is recorded in block #1 of track B in this sector interval. This distribution of data blocks continues such that, in block #0, 1, 2, 3, 4, 5, 6 and 7 of track A, data blocks n, n+2, n+4, n+6, n+8, n+10, n+12, and n+14 are recorded; and in block #0, 1, 2, 3, 4, 5, 6 and 7 in track B data blocks n+1, n+3, n+5, n+7, n+9, n+11, n+13 and n+15 are recorded. It is seen that these block addresses repeat at the commencement of sector interval 4m+2.

When format C is adopted, as shown in FIG. 3C, the successive data blocks are distributed in tracks A, B, C and D. Thus, the first data block (n) is recorded in block #0 of track A, the second data block (n+1) is recorded in block #0 of track B, the third data block (n+2) is recorded in block #0 of track C and the fourth data block (n+3) is recorded in block #0 of track D. This sequence of data block distributions continues, so as to record the data blocks in respective block numbers of tracks A-D, respectively, as illustrated. Upon the occurrence of sector interval 4m+2, the block addresses in each of tracks A-D repeat.

The foregoing may be summarized, when the record medium is, for example, ¼ inch width tape, as follows:

| Data Track | Format A | Format B | Format C |
|---|---|---|---|
| $TD_1$ | CH1 | CH1-A | CH1-A |
| $TD_2$ | CH2 | CH2-A | CH2-A |
| $TD_3$ | CH3 | CH3-A | CH1-C |
| $TD_4$ | CH4 | CH4-A | CH2-C |
| $TD_5$ | CH5 | CH1-B | CH1-B |
| $TD_6$ | CH6 | CH2-B | CH2-B |
| $TD_7$ | CH7 | CH3-B | CH1-D |
| $TD_8$ | CH8 | CH4-B | CH2-D |

In the foregoing, it is seen that, when format B is adopted, the first data block (A) for channel 1 (CH1) is recorded in data track $TD_1$, and the second data block (B) of channel 1 (CH1) is recorded in data track $TD_5$. A similar distribution occurs for channels 2–4.

When format C is adopted, the first data block (A) of channel 1 (CH1) is recorded in data block $TD_1$, the second data block (B) of channel 1 (CH1) is recorded in data track $TD_5$, the third data block (C) of channel 1 (CH1) is recorded in data track $TD_3$, and the fourth data block (D) of channel 1 (CH1) is recorded in data track $TD_7$. A similar distribution of successive data blocks A, B, C and D for channel 2 is recorded in data tracks $TD_2$, $TD_6$, $TD_4$ and $TD_8$, respectively.

The foregoing track assignments advantageously simplify the manner in which data is distributed or recovered for the different formats which may be used.

Figure 4:
FIG. 4 is a schematic diagram representing the arrangement of recording and playback transducers which may be used, with the advantages derived from the present invention, in carrying out an edit operation.

FIG. 4 schematically illustrates one example of the recording transducers, or heads, which are used for recording digitized information in the respective data tracks, as well as for recording the control signal in control track TC. The arrangement shown in FIG. 4 is particularly adapted to enable the information recorded in one track to be re-recorded in another track; and also to enable electronic editing, wherein information from a separate source, such as another record medium, is inserted into one or more desired data tracks at punch-in points. For the embodiment shown in FIG. 4, magnetic tape 1 is assumed to be driven in the direction indicated by the arrow.

The heads of FIG. 4 are comprised of a set of recording heads HR, a set of reproducing, or playback heads HP and another set of recording heads HR'. Each set of heads is comprised of aligned heads which are used for recording or reproducing information in respective data tracks TD, and also the control head for recording or reproducing the control signal in control track TC. Thus, recording heads HR actually are comprised of separate recording heads $HR_1$–$HR_8$ together with control signal recording head $HR_C$, all aligned across the width of tape 1. Likewise, additional recording heads HR' actually are comprised of recording heads $HR'_1$–$HR'_8$ and control signal recording $HR'_C$.

Recording heads HR are used to record original information in the respective data and control tracks of tape 1. For example, these heads may be used to form an original recording. The information recorded in these tracks is reproduced by associated ones of reproducing heads HP. When information recorded in one or more tracks is to be edited, that is, when this information is to be modified or replaced by additional information, recording heads HR' are operated, selectively, to record such additional information in the appropriate tracks. For example, in format A, the digitized information recorded in track $TD_1$ may be edited by locating the desired punch-in point and then, when that punch-in point reaches recording head $HR'_1$, the new information is recorded in data track $TD_1$. When the desired punch-out point is reached, recording head $HR'_1$ is disabled from recording the new information. Likewise, when information recorded in one channel, or one track, is to be re-recorded in another channel, or track, the information from the first channel, or track, is reproduced by the appropriate ones of reproducing heads HP, and the reproduced information then is supplied to the desired ones of recording heads HR' for re-recording in the appropriate tracks. The combination of heads HP and HR' may be used for so-called "sync" recording wherein one channel is recorded while another channel is reproduced. It will be appreciated that, even when the foregoing insert edit operations or "sync" recording is carried out, the control track is not modified. However, and as will be described below, control signals are recorded in the control track when an "assemble" edit operation is performed, wherein new inforation is recorded, following the previously recorded information.

Typical examples of electronic editing which may be used with the arrangement of the transducers shown in FIG. 4 are described in U.S. application Ser. No. 116,401, filed Jan. 29, 1980, and also in U.S. Ser. No. 195,625, filed Oct. 9, 1980, both of these applications being incorporated herein by reference.

Figure 5:
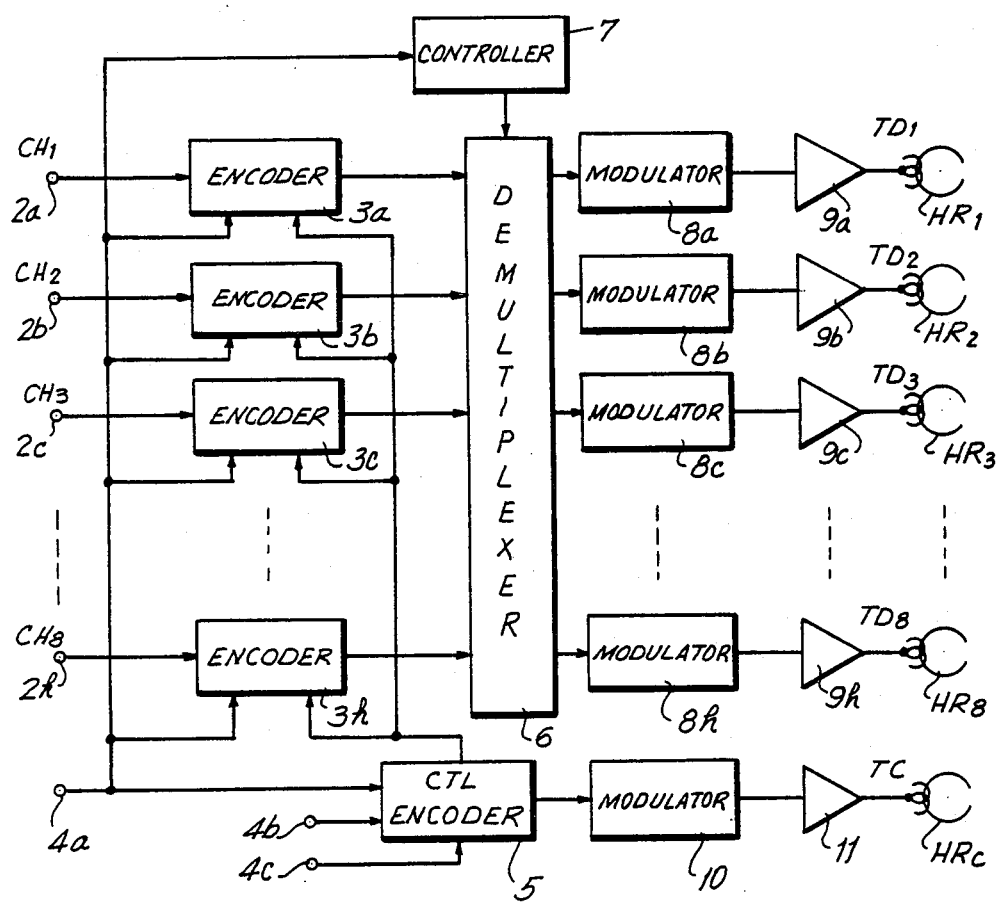
FIG. 5 is a block diagram of one embodiment of the recording section for recording information on the record medium with which the present invention is used.

Turning now to FIG. 5, there is illustrated a block diagram of one embodiment of apparatus which may be used to record digitized information in a selected one of various different formats. This digitized information may represent digital audio signals, such as PCM audio signals, which have been converted into digital form in accordance with a selected sampling rate $f_s$, and which have been selectively emphasized in accordance with a conventional emphasis circuit. For simplification, FIG. 5 represents apparatus for use with ¼ inch width tape.

The illustrated recording apparatus is adapted to receive up to eight channels of digitized information, and to record the received channels of information in respective data tracks. As mentioned above, the number of tracks in which each channel of information is recorded is dependent upon the selected format. Accordingly, the illustrated apparatus is provided with eight input terminals $2a \ldots 2h$, each adapted to receive a respective channel of digitized information CH1 . . . CH8, respectively. Input terminals $2a-2h$ are coupled to encoders $3a-3h$, respectively.

Each encoder may be of the cross-interleaved error correction type described hereinabove or, alternatively, the encoders may be adapted to encode the digitized information in other error correction encoding schemes. Each encoder may be operable in accordance with different formats such that a particular encoding scheme is adopted in accordance with a format identifying signal supplied thereto. For this purpose, an additional input terminal $4a$ is provided to receive a format control signal which may be generated by, for example, an operator of the illustrated apparatus.

In order to simplify the present description, it is assumed that only one type of encoding scheme is used, such as the aforementioned cross-interleaved error correction code. Thus, regardless of the format which is selected, this same encoding scheme will be employed to encode each channel of digitized information. However, it is contemplated that different encoding schemes may be used to accommodate different formats. The particular encoding scheme which is selected, that is, the particular mode of operation of the illustrated encoders, is dependent upon the format control signal supplied to such encoders from input terminal $4a$.

The encoded digitized information produced by encoders $3a-3h$ are supplied to respective inputs of a demultiplexor 6. This demultiplexor is adapted to distribute the digitized information supplied to the respective inputs thereof to preselected outputs, depending upon the particular format which has been selected. In this regard, demultiplexor 6 is coupled to a controller 7 which, in turn, is coupled to input terminal $4a$ to receive the format control signal.

In one embodiment the demultiplexor includes a set of switching circuits, the operation of which is controlled by controller 7. For example, if the format control signal supplied to input terminal $4a$ identifies format A, controller 7 controls the switching circuits of demultiplexor 6 such that the digitized information supplied to each input of the demultiplexor from encoders $3a-3h$, respectively, is coupled to a corresponding respective output. That is, each channel of digitized information is distributed to only a single output of demultiplexor 6. If, however, the format control signal supplied to input terminal $4a$ identifies format B, controller 7 controls demultiplexor 6 to distribute each channel of digitized information supplied to a respective input to two outputs. In this regard, only four channels (CH1-CH4) of digitized information are supplied to the illustrated recording apparatus. Each channel is distributed to two respective outputs of the demultiplexor in accordance with the foregoing table. Likewise, if the format control signal supplied to input terminal $4a$ identifies format C, controller 7 controls the switching circuits of demultiplexor 6 such that each channel of digitized input information supplied to the demultiplexor is distributed to four respective outputs. When format C is adopted, it is appreciated that only two channels (CH1 and CH2) of digitized information are supplied to the illustrated recording apparatus. Demultiplexor 6 is controlled so as to distribute these channels of digitized information in the manner summarized by the foregoing table.

In the foregoing description, it should be recognized that the digitized information supplied to each input of demultiplexor 6 is encoded in, preferably, the cross-interleaved error correction code by encoders $3a-3h$, respectively. Thus, a particular input of the demultiplexor is supplied with consecutive data blocks of the type shown in FIG. 2F, each data block having been formed in the manner described in the aforementioned, incorporated patent applications.

The outputs of demultiplexor 6 are coupled to modulators $8a-8h$, respectively. Each modulator may be of the type described in aforementioned application Ser. No. 222,278. Although not shown herein, each modulator alternatively may be adapted to operate in different modes of operation so as to carry out different types of modulation. The particular type of modulation which is adopted is dependent on and controlled by the format control signal supplied to input terminal 4a. Thus, depending upon the particular format which is adopted by the operator, a corresponding type of modulation is effected.

The outputs of modulators 8a–8h are coupled to data recording heads HR1–HR8 via recording amplifiers 9a–9h to be recorded in data tracks $TD_1$–$TD_8$, respectively. Thus, each received channel of digitized information is recorded in the selected format on, for example, magnetic tape. That is, a selected encoding scheme, type of modulation, tape speed and number of tracks per channel are adopted in accordance with the particular format which is used.

FIG. 5 also illustrates a control channel whereby the control signal shown in FIG. 2B is produced, modulated and recorded in a separate control track TC. The control channel is coupled to input terminal 4a and also to additional input terminals 4b and 4c. Input terminal 4b is adapted to receive a sampling identification signal which identifies, or represents, the particular sampling rate $f_s$ which has been used to digitize the original input analog information. Input terminal 4c is adapted to receive an appropriate clock signal for synchronizing the operation of the control channel. These input terminals 4a, 4b and 4c are connected to a control signal encoder 5 which, for example, includes a control word generator responsive to the format control signal and the sampling identification signal to produce the aforementioned control word comprised of control bits $C_0$–$C_{15}$. The control signal encoder also includes a synchronizing signal generator for generating the preamble and synchronizing pattern shown in FIG. 2A in response to the clock signal supplied to input terminal 4c. In addition, the control signal encoder includes a sector address generator which, preferably includes a multi-bit binary counter, such as a 30-bit counter. Also included in control signal encoder 5 is a CRC word generator which may be of a conventional type and which is supplied with the generated control word and sector address to produce an appropriate CRC word.

The control signal (shown in FIG. 2B) produced by control encoder 5 is coupled to control recording head $HR_C$ via an FM modulator 10 and a recording amplifier 11. It is preferred to record the control signal as a frequency-modulated signal so as to facilitate the reproduction and detection thereof for all formats. That is, even though the tape speed may differ from one format to another, the frequency-modulated control signal may, nevertheless, be accurately detected.

Although not shown in FIG. 5, each of the encoders 3a–3h includes a data synchronizing signal generator for generating the data synchronizing signal illustrated in FIGS. 2D and 2E. That is, the particular synchronizing pattern shown in FIGS. 2D and 2E is generated by each encoder. Furthermore, each encoder is adapted to supply the block address $[B_2B_1B_0]$ for identifying the particular block which is recorded in each sector interval in each data track. This block address is derived from, for example, the three least significant bits included in the 30-bit counter of encoder 5. Thus, this 30-bit counter is seen to generate both the sector address and the block address. Hence, this counter may be incremented in synchronism with the generation, or formation, of each data block produced by encoders 3a–3h. It is appreciated that, after four data blocks have been generated, the two least significant bits of the 30-bit counter repeat their cycle. Likewise, after eight data blocks have been generated, the three least significant bits of the 30-bit counter are repeated. Hence, the aforementioned block and sector addresses are generated by this 30-bit counter.

From the foregoing, it is appreciated that the same block address is recorded for each data block that is recorded in the same relative position in a sector interval in each of the plural data tracks. The first data block recorded in all of the tracks, regardless of the format, includes the block address [000], the second data block in each of these tracks, regardless of the particular channel from which that data block is derived, contains the block address [001], and so on.

It is appreciated that the 30-bit counter included in encoder 5 which is used to generate the sector and block addresses may be incremented by a clock signal supplied thereto, which signal has a period equal to a block period and which is in synchronism with the digital signals that are applied to input terminals 2a–2h. Consequently, the sector address progressively and uniformly increases from one sector to the next. Alternatively, the sector address may uniformly decrease in succeeding sector intervals.

Although not shown herein, each of encoders 3a–3h also may include an emphasis identification generator for generating the emphasis identification signal $FB_1FB_0$, described above.

It will be appreciated that the timing of the encoders is a function of the particular format which has been adopted. In this regard, a suitable timing control circuit, including an adjustable clock generator, may be provided in each encoder, the operation of each timing control circuit being controlled, or changed over, in response to the format control signal supplied to input terminal 4a. Thus, proper timing of the encoded digitized information is achieved so as to be consistent with the selected format.

Figure 6:
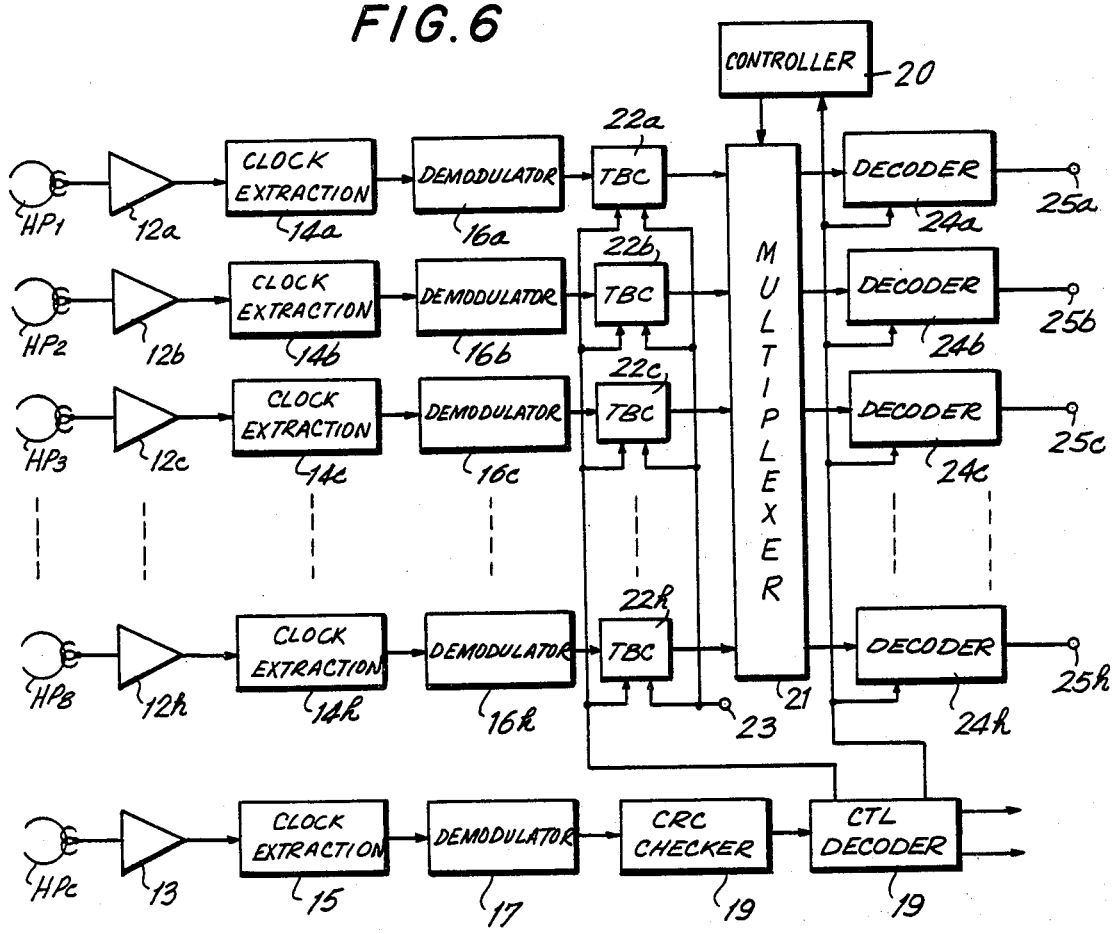
FIG. 6 is a block diagram of one embodiment of the reproducing section in which the present invention finds ready application.

Referring now to FIG. 6, there is illustrated a block diagram of reproducing apparatus for reproducing the digitized information from respective tracks of the record medium, which apparatus is compatible with any one of the particular formats which may be used to record that information. This embodiment of the data reproducing apparatus is comprised of reproducing heads $HP_1$–$HP_8$ adapted to reproduce the digitized information which had been recorded in data tracks $TD_1$–$TD_8$, respectively. Heads $HP_1$–$HP_8$ are coupled to demodulators 16a–16h via playback amplifiers 12a–12h and clock signal extracting circuits 14a–14h, respectively. Each clock signal extracting circuit includes a phase-locked loop for generating a clock signal of desired repetition rate, which phase-locked loop is synchronized with, for example, the bit timing rate, or phase, of the reproduced digital signals. The synchronizing pattern recorded in the respective data tracks at the head of each data block may be used to synchronize the phase-locked loop. Hence, the bit timing, or clock signals, are extracted from the data which is reproduced from each track.

Each demodulator is adapted to be compatible with the particular type of modulation which had been used to record the digitized information. Consequently, each demodulator may include selectable demodulator circuitry responsive to a format identification signal (such as represented by control bits $C_0$–$C_{15}$ of the recorded control signal) to select the appropriate demodulating circuitry.

Demodulators 16a–16h are coupled to respective inputs of a multiplexor 21 via time base error correctors 22a–22h, respectively. Multiplexor 21 is controlled by a suitable controller 20, this controller being responsive to a decoded format identification signal for establishing the appropriate switching sequences for the multiplexor. The outputs of multiplexor 21 are coupled to decoders 24a–24h, respectively, which decoders may be of the type described in the aforementioned incorporated patent applications adapted to decode, for example, the preferred cross-interleaved error correction code which had been used to record the digitized information. The outputs of decoders 24a–24h are coupled to output terminals 25a–25h, respectively, so as to recover the original channels of digitized information CH1–CH8, respectively.

The reproducing apparatus shown in FIG. 6 also includes a control channel adapted to recover the control signal (FIG. 2B) which had been recorded in control track TC. In this regard, the control channel includes a control reproducing head $HP_C$ coupled to an FM demodulator 17 via a playback amplifier 13 and a clock signal extracting circuit 15. This clock signal extracting circuit may be similar to any one of aforedescribed clock signal extracting circuits 14a–14h. The FM demodulator is adapted to demodulate the control signal which had been frequency modulated prior to recording. This demodulated control signal then is supplied to an error-detecting circuit 18, such as a CR check circuit, which operates in a known manner in response to the CRC code word included in the control signal for the purpose of detecting whether an error is present in the control signal. That is, CRC check circuit 18 detects whether the control word $C_0$–$C_{15}$ of the sector address $S_0$–$S_{27}$ contains an error. If no error is detected, the control signal is supplied to a decoder 19 which operates to recover the control word ($C_0$–$C_{15}$), the sector address and the synchronizing pattern included in the control signal. However, if an error is detected in the reproduced control signal, an immediately preceding control word, which had been stored in the event that the next-following control signal may be erroneous, is used. In this regard, a delay circuit having a time delay equal to one sector interval may be provided in, for example, decoder 19.

The recovered control word ($C_0$–$C_{15}$) is supplied to controller 20 to establish the particular switching arrangement for multiplexor 21, by which the digitized information which is reproduced from data tracks $TD_1$–$TD_8$ is re-distributed, or re-formed, back to the proper channels. This control word also is supplied to decoders 24a–24h to select the appropriate decoding scheme which is compatible with the particular encoding scheme which had been used for recording the digitized information. Also, depending upon the number of tracks per channel which had been used for recording, the timing control of the decoders may be adjusted to be compatible therewith, the number of tracks per channel being represented, of course, at least by control bits $C_9$–$C_{11}$. Also, the sampling identification data, comprised of bits $C_{12}$–$C_{15}$, may be used by digital-to-analog circuitry (not shown) so as to recover the original analog signal in each channel.

Preferably, the reproducing apparatus illustrated in FIG. 6 recovers the original digitized information, which information then is supplied to suitable converting circuitry for converting the digital signals back to their original analog form. For example, if the illustrated apparatus is used as a so-called PCM audio recorder, the digitized information produced at the outputs of decoders 24a–24h is in the form of PCM signals, and each PCM signal is converted into a corresponding analog level so as to re-form the original analog audio signal.

Decoder 19 also recovers the control synchronizing dignal (FIG. 2A) and the sector address $S_0$–$S_{27}$ included in each reproduced control signal. This control synchronizing signal, which exhibits a repetition rate determined by the sector interval, is supplied to a servo circuit for the tape-drive capstan to effect control over that capstan such that the record tape is driven uniformly for the reproducing operation. The sector address is used to identify a particular sector interval in which a desired data block is recorded, thereby enabling precise punch-in and punch-out points to be accessed for an edit operation. The sector address also may be used to locate desired data recorded in any one or more of data tracks $TD_1$–$TD_8$. As will be described below, the sector address is used to detect an edit point, such as a splice edit point, on the record medium.

Each of time base correctors 22a–22h is adapted to correct time base errors which may be introduced into one or more data tracks during reproduction. Such time base errors may be due to tape jitter, expansion (or contraction) of the tape after data has been recorded thereon, or a disturbance in the normal synchronous relationship between the data and control tracks due to, for example, editing of only one (or less than all) channel. Each time base corrector preferably includes an addressable memory device, such as a random access memory (RAM) whose capacity is at least equal to a sector interval (i.e. four data blocks) and, desirably, has a memory capacity adequate to account for maximum time base variations that may be expected. Typically, a memory capacity capable of storing eight data blocks is sufficient.

Each data block is written into the RAM of a respective time base corrector, word-by-word, in response to the extracted clock signals derived from the reproduced signal. Hence, as in conventional time base correctors, the reproduced data is written into the RAM in synchronism with the time base variations that may be present in the reproduced signals. The time base correctors are coupled in common to a read clock terminal 23 adapted to be supplied with a read clock signal of fixed, reference frequency. Accordingly, each data block is read out of the RAM at a constant reference rate, thereby eliminating therefrom the time base variations that may have been present during reproduction.

The particular location in the RAM of the time base corrector in which a demodulated data block is written is a function of the block address $[B_2B_1B_0]$ included in that data block. However, in the event of what may be viewed as severe time base errors caused by, for example, editing, the data blocks recorded in the edited track may be skewed relative to the remaining tracks, and particularly with respect to control track TC. Nevertheless, this skew is eliminated by time base correctors 22a–22h. In particular, the coincidence between the most significant bit $B_2$ of the block address and the least significant bit $S_0$ of the sector address permits each skewed data block to be written into the proper location of the RAM, provided this skew is less than a full sector interval.

As described above, the data blocks read out of time base correctors 22a–22h are supplied to multiplexor 21 which operates to recover each channel of digitized information from the respective data tracks in which those channels were recorded. For example, if the digitized information had been recorded in format A, then multiplexor 21 supplies the successive data blocks which are applied thereto from time base correctors 22a–22h (as derived from data tracks $TD_1$–$TD_8$) to decoders 24a–24h, respectively. Alternatively, if the digitized information had been recorded in format B, then multiplexor 21 supplies the successive data blocks which are applied thereto from time base correctors 22a and 22e to decoder 24a, the successive data blocks which are applied thereto from time base correctors 22b and 22f to decoder 24b, and so on. Likewise, if the digitized information had been recorded in format C, then multiplexor 21 supplies the successive data blocks which are applied thereto from time base correctors 22a, 22e, 22c and 22g to decoder 24a, and the successive data blocks which are applied thereto from time base correctors 22b, 22f, 22d and 22h to decoder 24b. The multiplexor may be of complementary construction to that of demultiplexor 6 (FIG. 5).

The decoders include CRC check circuits to detect if an error is present in each data block applied thereto (by conventional CRC-check techniques), de-interleaving circuits to de-interleave the digital words which constitute the respective data blocks, error-correction circuits to correct errors that may be present in the de-interleaved words (by using the Q- and P-parity words in known manner), and interpolating circuits to compensate, or conceal, those errors which might not be correctable (by using interpolating techniques of the type described in those applications which are incorporated herein by reference). The resultant data words produced at output terminals 25a–25h may be PCM audio signals which are converted into analog form by digital-to-analog converters (not shown) coupled to such output terminals.

As mentioned above, the sector address $S_0$–$S_{27}$ is used to detect the occurrence of a splice edit point on the record medium. if the record medium is a magnetic tape, it is appreciated that, as is conventional in analog audio recording techniques, two separate tapes may be joined, or spliced, such that the information recorded on one may follow the information previously recorded on the other. Such splice editing advantageously may be employed in digital audio recordings; and the present invention provides a relatively simple yet precise means by which the location of the splice edit point between the two tapes may be located. Once this splice edit point is determined, a relatively smooth transition between the information recorded on the respective tapes may be achieved, as described in aforementioned U.S. application Ser. Nos. 116,401 and 195,625. Preferably, decoder 19 includes apparatus by which the splice edit point is detected. One embodiment of this apparatus is illustrated in the block diagram of FIG. 7.

The illustrated splice edit point detector is comprised of an address separator 26, a presettable counter 28, a comparator 27, a delay circuit 36 and a coincidence detector, or AND gate 37. Address separator 26 is supplied with the control signal reproduced from the control track by playback head $HP_C$, which control signal has been demodulated in demodulator 17 and subjected to error detection in CRC check circuit 18. The address separator may include conventional gating circuitry for separating the sector address (also referred to herein as the address signal) $S_0$–$S_{27}$ from the reproduced control signal. For example, this gating circuitry may be actuated at a predetermined time following the detection of the synchronizing pattern which is provided at the head of the control signal. The separated address signal may be supplied to other circuitry (not shown) in order to implement other functions and, in addition, this separated address signal is supplied to comparator 27 and also to counter 28.

Counter 28 is a presettable counter having an input terminal, a clock terminal, a load terminal and output terminals. The input terminal of counter 28 is supplied with the separated address signal; and this counter is adapted to be preset, or loaded, with this address signal in response to a load signal supplied to its load terminal. As illustrated, the load terminal of counter 28 is coupled to the output of AND gate 37 for a purpose soon to be described.

The clock input of counter 28 is coupled to a source of clock signals 29, these clock signals being derived from, for example, clock signal extracting circuit 15, described above with respect to FIG. 6. Thus, the clock terminal of the counter is supplied with clock pulses having a repetition rate equal to the rate at which each sector interval is reproduced from the magnetic tape. The count of counter 28 is adapted to be incremented by unity in response to each clock pulse supplied to its clock terminal. These clock pulses also are supplied to delay circuit 36.

The output terminals of counter 28 are coupled to comparator 27. This comparator is adapted to compare the separated address signal which is reproduced from the magnetic tape each sector interval with the count of counter 28. As will be further explained below, the count of counter 28 corresponds to a "predictive" address, that is, the address which is expected to be reproduced each sector interval from the magnetic tape. Comparator 27 produces an output signal in the event that the reproduced address signal differs from the predictive, or expected, address signal. For the purpose of the present description, it is assumed that this output signal produced by the comparator is a binary "1".

The output of comparator 27 is coupled to delay circuit 36 by an AND gate 35. This AND gate includes another input coupled to a terminal 33 via an inverter circuit 34. Terminal 33 is adapted to be supplied with a binary "0" in the event that CRC check circuit 18 (FIG. 6) detects the absence of an error in the reproduced control signal. In the event of a detected error, a binary "1" is supplied to terminal 33. Thus, by means of inverter 34, AND gate 35 is enabled only if the reproduced control signal is error free. It will be appreciated that, in the absence of a detected error in the control signal, the reproduced address signal may be assumed to be correct.

Delay circuit 36 is adapted to impart a predetermined delay to the output produced by comparator 27, which output is gated thereto when AND gate 35 is enabled. The delay imparted to this output signal by delay circuit 36 is equal to the period separating successive ones of the reproduced address signals. It is appreciated that, therefore, delay circuit 36 imparts a delay equal to one sector interval to the output signal produced by comparator 27. As will be described below, this output signal produced by comparator 27 represents a discontinuity in the reproduced address signal, which discontinuity is indicative of an edit splice point. Hence, delay circuit 36 functions to store an edit splice point indication for a duration equal to one sector interval. Delay circuit 36 thus may be constructed as, for example, a shift register, a delay line, or other conventional delay circuit.

The output of delay circuit 36 and the output of AND gate 35 are coupled to respective inputs of AND gate 37. AND gate 37 functions to produce an edit splice point indication in the event that the delayed output of comparator 27 as well as the undelayed output thereof coincide. It will be appreciated that this edit splice point indication thus is produced only if two successive reproduced address signals differ from two successive predictive address signals. This avoids a premature indication of a splice edit point in the event that a spurious address signal is reproduced or a spurious predictive address signal is generated, even if CRC check circuit 18 fails to detect an error in the reproduced control signal. Alternatively, any desired number of successive mis-comparisons between the reproduced and predictive address signals may be used in order to prevent a spurious indication of the edit splice point.

Figure 7:
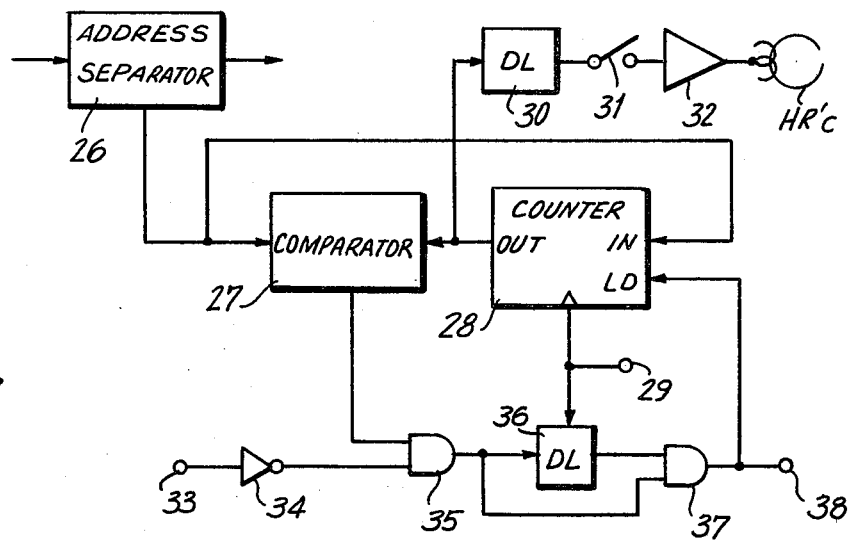
FIG. 7 is a block diagram of one embodiment of the present invention.

FIG. 7 also illustrates the output terminals of counter 28 coupled through a delay circuit 30 and a switching circuit 31 to control recording head $HR'_C$ via recording amplifier 32. Delay circuit 30 may be of similar construction as delay circuit 36 so as to delay the predictive address signal produced by counter 28 by a duration equal to one sector interval. In the event that the predictive address signal should be recorded in the control track, as when an assemble edit operation is carried out, switching circuit 31 is actuated so as to couple the delayed predictive address signal to the control recording head.

The manner in which the edit splice point detector shown in FIG. 7 operates now will be described. As the magnetic tape is driven during a reproduction mode of operation, the control signal recorded on control track TC is reproduced by playback head $HP_C$, shown in FIG. 6. Clock pulses are generated by clock extracting circuit 15, these clock pulses being synchronized with the rate at which each sector interval is reproduced. As mentioned above, such clock pulses may be synchronized with the synchronizing pattern which precedes each control signal, as shown in FIG. 2B. These clock pulses are supplied to clock terminal 29 and, thus, are coupled to the clock input of counter 28 and also to delay circuit 36.

Let it be assumed that the reproduced control signal is substantially error-free. Hence, CRC check circuit 18 detects the absence of an error in the control signal which is reproduced during recurring sector intervals. As a result thereof, a binary "0" is applied by CRC check circuit 18 to input terminal 33. This binary "0" is inverted by inverter 34 to enable AND gate 35.

In addition, the reproduced control signal is supplied to address separator 26, and the reproduced address signal included in that control signal is separated therefrom and supplied to comparator 27.

Let it be assumed that an initial, or first, reproduced address signal had been loaded previously in counter 28. Thus, this counter had been preset with this reproduced address signal. As each subsequent sector interval is reproduced, this preset count is incremented by the respective clock pulses supplied from clock terminal 29 to the clock input of the counter. For example, let it be assumed that, initially, counter 28 had been preset with an initial address signal corresponding to address 65 at the time that address 65 is reproduced from the magnetic tape. Then, as the next sector interval is reproduced, the count in counter 28 is incremented to the predictive address 66. When the next-following sector interval is reproduced, this predictive address is incremented to the address 67. This incrementing continues as each recurring sector interval is reproduced.

It is expected that the predictive address, which is incremented from one reproduced sector interval to the next, will be equal to the address signal which is reproduced during such sector intervals. Thus, when the preset address in counter 28 is incremented to address 66, the address which actually is reproduced from the magnetic tape also will be address 66. Hence, comparator 27 produces a binary "0" output indicative of this comparison. Then, when the next-following sector interval is reproduced, counter 28 is incremented to generate address 67, and the reproduced address also will be address 67, resulting in another binary "0" produced by comparator 27. Thus, as each successive sector interval is reproduced, it is expected that the address signal reproduced from the magnetic tape will be equal to the predictive address signal generated by counter 28.

Let it now be assumed that an edit splice point is reached on the magnetic tape. The consecutive addresses recorded upstream of this splice point generally will differ substantially from the consecutive addresses recorded downstream thereof. Hence, a discontinuity is present across the edit splice point. Consistent with the foregoing numerical example, let it be assumed that the last address which is recorded immediately upstream of the edit splice point is address 75, and the next-following address which is recorded immediately downstream of the splice point may be, for example, address 160. When address 75 is reproduced from the magnetic tape, it is expected that it will compare favorably with predictive address 75, generated by counter 28 in the aforedescribed manner. Then, when the next-following address 160 is reproduced, counter 28 will have been incremented to predictive address 76. It is appreciated that comparator 27 detects a difference between the reproduced and predictive address signals, thereby producing a binary "1" output. If AND gate 35 is enabled (i.e. the control signal then reproduced from the magnetic tape is error-free), the binary "1" output from comparator 27 will pass through AND gate 35 as a splice point indication signal. This splice point indication signal is applied to delay circuit 36 whereat it is stored, or delayed, for a duration equal to the time required to reproduce one sector interval from the magnetic tape.

When the next-following sector interval is produced, counter 28 is incremented to generate the predictive address 77. However, the address signal which is reproduced from the magnetic tape during this sector interval is address 161. Accordingly, comparator 27 detects the difference between the reproduced and predictive address signals to produce another binary "1" output. At this time, the preceding binary "1" splice point indication signal which had been applied to delay circuit 36 now is produced at the output of this circuit and is seen to coincide with the presently obtained binary "1" splice point indication signal now produced by the comparator. AND gate 37 senses this coincidence to supply a binary "1" splice point signal to output terminal 38. This splice point signal also is used as a "load" signal, and is supplied to the load terminal of counter 28, thereby actuating the counter to load, or preset, the reproduced address signal now supplied to the input terminal thereof. Hence, counter 28 is preset with adequal to 75. Likewise, since the immediately preceding address had been address 74, the next-expected address generated by adder 40 likewise is equal to address 75. Consequently, comparators 27 and 41 both produce binary "0"s. The next-following address reproduced from the magnetic tape is assumed to be address 160 which is immediately downstream of the splice edit point. At the time that this address is reproduced, the predictive address generated by counter 28 is equal to address 76; and the next-expected address produced by adder 40 also is equal to address 76. Consequently, since the address signal which is reproduced from the magnetic tape is not equal to the predictive address nor to the next-expected address, both comparators 27 and 41 produce binary "1"s. Inverter 42 inverts this binary "1" to prevent AND gate 35 from generating the splice point detection signal at this time.

The address signal which is reproduced from the magnetic tape in the next sector interval is assumed to be address 161. The preceding address 160 had been delayed in delay circuit 39 and incremented by adder 40 so as to generate the next-expected address 161. Consequently, the actually reproduced address signal is equal to the next-expected address signal. Hence, comparator 41 once again produces a binary "0". Now, however, the predictive address signal generated by counter 28 will be equal to address 77. Since the reproduced address 161 differs from this predictive address, comparator 27 supplies a binary "1" to AND gate 35. This AND gate now is supplied with a binary "1" at each input thereof to produce the splice point detection signal at output terminal 38.

Figure 8:
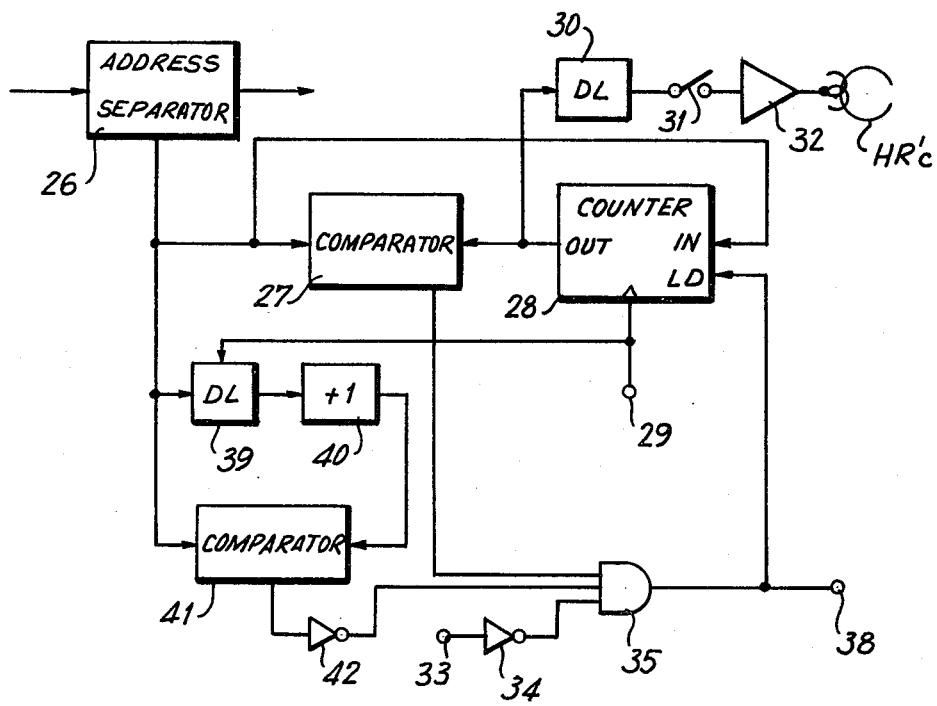
FIG. 8 is a block diagram of another embodiment of the present invention.

From the foregoing description of the operation of the embodiment shown in FIG. 8, it is appreciated that the combination of delay circuit 39, adder 40 and comparator 41 cooperates with comparator 27 to ensure that two successive differences between the reproduced and predictive address signals must be detected and, moreover, that the address signals which are reproduced following a sensed discontinuity therein should be consecutive addresses, in order to produce the splice point detection signal. That is, delay circuit 39, adder 40 and comparator 41 function to sense consecutive addresses. Comparator 27 and counter 28 function to sense discontinuities in the reproduced address signal. Accordingly, when a discontinuity is sensed, the splice point detection signal is generated if consecutive addresses are reproduced following this sensed discontinuity. That is, the occurrence of an edit splice point is indicated if a discontinuity in the reproduced address signals followed by uniformly increasing signals is detected.

While the present invention has been particularly shown and described with reference to certain preferred embodiments thereof, it will be readily apparent to those of ordinary skill in the art that various changes and modifications in form and details may be made without departing from the spirit and scope of the invention. For example, in the event that CRC check circuit 18 detects the presence of an error in the reproduced control signal, the operation of comparator 27 may be inhibited. As another example, rather than comparing successive reproduced address signals to successive predictive and next-expected address signals, every other, or every third, or the like reproduced address signal may be compared to corresponding predictive and next-expected address signals. Also, an indication of the occurrence of an edit splice point may be made immediately upon the detection of a discontinuity in the reproduced address signal, as sensed by comparator 27, rather than provide this indication when a predetermined number of reproduced address signals differ from corresponding predictive address signals. It is intended that the appended claims be interpreted as including the foregoing as well as various other changes and modifications.

What is claimed is:

1. A method of detecting a splice point on a record medium having data recorded thereon in at least one data track and having a control track in which is recorded a periodic control signal including address signals for identifying successive intervals on said record medium, said data being recorded in successive ones of said successive intervals and said address signals normally being incremented from one interval to the next, said method comprising the steps of reproducing said address signals; detecting one of said reproduced address signals; generating successive predictive address signals starting from said one reproduced address signal and which are indicative of the addresses expected for successive intervals thereafter; and sensing when an address signal reproduced in an interval differs from the predictive address signal generated for that interval, thereby detecting the occurrence of a splice point.

2. The method of claim 1 wherein said step of generating successive predictive address signals comprises incrementing said detected address signal from one reproduced interval to the next.

3. The method of claim 1 wherein said step of detecting the occurrence of a splice point comprises sensing when two successive reproduced address signals differ from two successive predictive address signals.

4. The method of claim 1 wherein said step of detecting a first address signal comprises loading the address signal reproduced from said record medium into a counter when a reproduced address signal differs from a predictive address signal.

5. The method of claim 4 wherein said step of generating successive predictive address signals comprises generating timing pulses in synchronism with the intervals reproduced from said record medium; and incrementing said counter with said timing pulses.

6. Apparatus for sensing an edit point on a record medium having at least one track in which digitized information is recorded and a control track in which a periodic control signal is recorded, said periodic control signal including an address signal which normally is incremented uniformly in periodic intervals, said apparatus comprising means for reproducing said address signals; predicting means responsive to one of said reproduced address signals to generate a predictive address signal starting from said one of said reproduced address signals which represent the address signal which is expected to be reproduced during said periodic intervals thereafter; and indicating means for producing an indication when said reproduced address signal differs from said predictive address signal, thereby sensing the occurrence of an edit point.

7. The apparatus of claim 6 wherein said predicting means comprises counter means; means for loading said counter means with a predetermined reproduced address signal; and means for incrementing the count of said counter means in synchronism with each reproduced interval.

8. The apparatus of claim 7 wherein said predetermined reproduced address signal is the first address signal reproduced from said record medium.

dress 161. It is appreciated that, when the next sector interval is reproduced from the magnetic tape, the count stored in counter 28 is incremented so as to generate predictive address 162; and the address signal then reproduced from the magnetic tape also will be address 162. Then, the foregoing operations, including the comparison between the reproduced and predictive address signals, are repeated.

The apparatus illustrated in FIG. 7 also is operable to record new address signals on the magnetic tape. For example, in an assemble edit operation wherein new information is recorded following previously-recorded information, the successive predictive addresses generated by counter 28 may be recorded in corresponding sector intervals, in association with the newly-recorded information, merely by closing switch 31. The one sector interval delay provided by delay circuit 30 serves to ensure that the proper address signal is recorded in the correct sector interval. Nevertheless, this recording of the sector address is accompanied by the recording of the synchronizing signal and control word shown in FIG. 2B. It is recognized that the apparatus by which this control signal may be recorded is similar to that included in encoder 5 (FIG. 5).

In the apparatus illustrated in FIG. 7, the detection of a splice point is provided at output terminal 38 after two successive reproduced address signals differ from two successive predictive address signals. Alternatively, this splice point detection signal may be produced after any predetermined number of reproduced address signals have been sensed to differ from their predictive address signals. It is preferred to sense at least two successive differences between the reproduced and predictive address signals in order to minimize an erroneous or spurious splice point detection.

In the embodiment of the address signal shown in FIG. 2B, it is assumed that the address is represented as a 28-bit word. It is appreciated, therefore, that in the presence of a splice edit point, there is a very low probability that two successive address signals will be continuous, that is, that they will differ by unity. Consequently, and in view of this low probability, comparator 27 and counter 28 may be simplified so as to have a capacity less than 28 bits. Thus, a predetermined number of lower order bits of the reproduced address can be examined and compared to a similar number of bits constituting the predictive address in order to determine a discontinuity in the reproduced address, thereby indicating the occurrence of a splice edit point. Furthermore, by enabling AND gate 35 only when the reproduced control signal is determined to be error-free, the possibility of improperly sensing a discontinuity in the reproduced address signal due to, for example, an error therein, is substantially reduced.

Referring now to FIG. 8, there is illustrated another embodiment of the edit splice point detector in accordance with the present invention. In this embodiment, the splice point which separates successive address signals upstream thereof from successive address signals downstream thereof is detected. Portions of the embodiment shown in FIG. 8 are similar to correspondingly identified portions shown in FIG. 7. However, the embodiment of FIG. 8 differs from that of FIG. 7 in that a delay circuit 39, an adder 40, a comparator 41 and an inverter 42 are provided. Delay circuit 39 may be similar to aforedescribed delay circuit 36 and is coupled to address separator 26 for delaying a reproduced address signal by one sector interval. The output of delay circuit 39 is coupled to adder 40, the latter being adapted to increment the delayed, reproduced address signal by unity. The output of adder 40 is coupled to one input of comparator 41, the other input of this comparator being coupled to address separator 26 so as to compare the reproduced address signal with the incremented, delayed address signal. It will be appreciated that the incremented, delayed address signal produced at the output of adder 40 represents the next-expected address to be reproduced from the magnetic tape.

Comparator 41 is adapted to produce a binary "0" when the reproduced address signal is equal to the expected address signal, and to produce a binary "1" when these address signals differ. Inverter 42 functions to invert the output produced by comparator 41 and to supply this inverted output to a respective input of AND gate 35. As illustrated, AND gate 35 includes another input coupled to the output of comparator 27, as in the FIG. 7 embodiment, and a further input coupled to terminal 33 via inverter 34 so as to receive an enabling signal when CRC check circuit 18 (FIG. 6) detects no error in the reproduced control signal.

In operation, comparator 27 and counter 28 function in the same manner as discussed above. Hence, counter 28 is loaded, or preset, with an initial address signal, and then this preset address is incremented in synchronism with the reproduction of successive sector intervals so as to generate successive predictive address signals. Comparator 27 compares each reproduced address signal to a predictive address signal to detect whether a discontinuity is present in the address signal reproduced from the magnetic tape. In the event of such a discontinuity, as when the reproduced address signal differs from the predictive address signal, a binary "1" output is supplied from comparator 27 to AND gate 35.

Delay circuit 39 and adder 40 cooperate to generate a next-expected address signal, depending upon the address signal which has been reproduced from the magnetic tape. Consistent with the numerical example discussed above, if address 66 is reproduced from the magnetic tape, this address is delayed by one sector interval in delay circuit 39 and then incremented to address 67 by adder 40. This delayed, incremented address signal is supplied to comparator 41 at the same time that the next-following address signal is reproduced from the magnetic tape. It is expected that this next-following reproduced address signal will be address 67. Since this reproduced address signal compares to the next-expected address signal, as produced at the output of adder 40, comparator 41 produces a binary "0" output which is inverted by inverter 42 to enable AND gate 35.

Reproduced address 67 is delayed in delay circuit 39 and incremented by adder 40 to form next-expected address 68. If the next reproduced address signal is equal to address 68, comparator 41 once again produces a binary "0" to enable AND gate 35.

It is appreciated that, while comparator 41 produces a binary "0" because the reproduced address signal is equal to the next-expected address signal, comparator 27 also produces a binary "0" because the reproduced address signal is equal to the predictive address signal generated by counter 28. This binary "0" produced by comparator 27 serves to prevent AND gate 35 from generating the splice point detection signal.

Now, let it be assumed that, as in the aforedescribed example, address 75 is reproduced from the magnetic tape. At the time that this address signal is reproduced, the predictive address generated by counter 28 also is 9. The apparatus of claim 7 wherein said predetermined reproduced address signal is the reproduced address signal which differs from said predictive address signal.

10. The apparatus of claim 6 wherein said indicating means includes means for sensing the occurrence of an edit point when two successive address signals reproduced from said record medium differ from the predictive address signal.

11. Apparatus for sensing an edit point on a record medium having at least one track in which digitized information is recorded and a control track in which a periodic control signal is recorded, said periodic control signal including an address signal which normally is incremented uniformly in periodic intervals, said apparatus comprising means for reproducing said address signal; predicting means responsive to said reproduced address signal to generate a predictive address signal representing the address signal which is expected to be reproduced during said periodic intervals; and indicating means for producing an indication when said reproduced address signal differs from said predictive address signal, said indicating means including delay means for delaying said indication by one interval; and coincidence means for sensing the coincidence of the delayed indication and an immediately following indication to thereby sense the occurrence of an edit point when two successive address signals reproduced from said record medium differ from the predictive address signal.

12. Apparatus for sensing an edit point on a record medium having at least one track in which digitized information is recorded and a control track in which a periodic control signal is recorded, said periodic control signal including an address signal which normally is incremented uniformly in periodic intervals, said apparatus comprising means for reproducing said address signal; predicting means responsive to said reproduced address signal to generate a predictive address signal representing the address signal which is expected to be reproduced during said periodic intervals; and indicating means for producing an indication when said reproduced address signal differs from said predictive address signal, thereby sensing the occurrence of an edit point, said indicating means comprising delay means for delaying the reproduced address signal by one interval; increment means for incrementing the delayed reproduced address signal to produce a next-expected address signal; first comparing means for comparing said next-expected address signal to the reproduced address signal to indicate when said reproduced address signal corresponds to said next-expected address signal; second comparing means for comparing said predictive address signal to said reproduced address signal to indicate when said reproduced address signal differs from said predictive address signal; and means for sensing said edit point when said reproduced address signal corresponds to said next-expected address signal but differs from said predictive address signal.

13. The apparatus of claim 12 wherein said means for sensing said edit point comprises a gate responsive to the concurrence of indications produced by said first and second comparing means.

14. Apparatus for sensing a splice edit point on a magnetic tape having plural data tracks in which digital information is recorded and a control track in which a control signal having an error detecting code and a uniformly increasing address signal is recorded on either side of said splice edit point, the address signal exhibiting a discontinuity across said splice edit point, said apparatus comprising reproducing means for reproducing said control signal; means for detecting if said reproduced control signal is free of error therein; address separating means for separating the address signal from the reproduced control signal; counter means for storing an initial reproduced address signal; increment means for incrementing said counter means in synchronism with the reproduction of each address signal to produce a predictive address signal; comparator means for comparing each reproduced address signal to each predictive address signal; and indicating means for indicating the occurrence of a splice edit point if said reproduced address signal does not compare to said predictive address signal, provided that said reproduced control signal is free of an error therein.

15. The apparatus of claim 14 wherein said initial reproduced address signal is the address signal reproduced when said splice edit point is indicated; and further comprising means for supplying each reproduced address signal to said counter means, and load means responsive to an indication of the occurrence of a splice edit point to load the supplied reproduced address signal into said counter means.

16. Apparatus for sensing a splice edit point on a magnetic tape having plural data tracks in which digital information is recorded and a control track in which a control signal having an error detecting code and a uniformly increasing address signal is recorded on either side of said splice edit point, the address signal exhibiting a discontinuity across said splice edit point, said apparatus comprising reproducing means for reproducing said control signal; means for detecting if said reproduced control signal is free of error therein; address separating means for separating the address signal from the reproduced control signal; counter means for storing an initial reproduced address signal; increment means for incrementing said counter means in synchronism with the reproduction of each address signal to produce a predictive address signal; comparator means for comparing each reproduced address signal to each predictive address signal; and indicating means for indicating the occurrence of a splice edit point, provided that said reproduced control signal is free of an error therein, said indicating means comprising delay means coupled to said comparator means for delaying, by the period separating the reproduction of successive address signals, a signal produced by said comparator means when said reproduced address signal does not compare to said predictive address signal; and coincidence sensing means for sensing the coincidence between the delayed and undelayed signals produced by said comparator means; whereby said splice edit point is indicated if successive reprouced address signals differ from successive predictive address signals.

17. Apparatus for sensing a splice edit point on a magnetic tape having plural data tracks in which digital information is recorded and a control track in which a control signal having an error detecting code and a uniformly increasing address signal is recorded on either side of said splice edit point, the address signal exhibiting a discontinuity across said splice edit point, said apparatus comprising reproducing means for reproducing said control signal; means for detecting if said reproduced control signal is free of error therein; address separating means for separating the address signal from the reproduced control signal; counter means for storing an initial reproduced address signal; increment means for incrementing said counter means in synchronism with the reproduction of each address signal to produce a predictive address signal; comparator means for comparing each reproduced address signal to each predictive address signal; and indicating means for indicating the occurrence of a splice edit point provided that said reproduced control signal is free of an error therein, said indicating means comprising delay means for delaying, by the period separating the reproduction of successive address signals, the reproduced address signal; means for incrementing the delayed address signal to produce an expected next-address signal; second comparator means for comparing the reproduced address signal to said expected next-address signal and to produce an output signal indicative thereof; and coincidence means for sensing the coincidence between the output signal produced by said second comparator means and a signal produced by the first-mentioned comparator means, the latter being produced when said reproduced address signal does not compare to said predictive address signal; whereby said splice edit point is indicated if successive reproduced address signals differ from successive predictive address signals but at least one of said successive reproduced address signals is equal to an expected next-address signal.

18. The apparatus of claim 14 further comprising selectively operative means for recording said predictive address signal in said control track.

* * * * *